US012473122B2

(12) United States Patent
Totani

(10) Patent No.: US 12,473,122 B2
(45) Date of Patent: Nov. 18, 2025

(54) BAG

(71) Applicant: Totani Corporation, Kyoto (JP)

(72) Inventor: Mikio Totani, Kyoto (JP)

(73) Assignee: Totani Corporation, Kyoto (JP)

(*) Notice: Subject to any disclaimer, the term of this patent is extended or adjusted under 35 U.S.C. 154(b) by 93 days.

(21) Appl. No.: 18/556,350

(22) PCT Filed: Mar. 31, 2022

(86) PCT No.: PCT/JP2022/016548
§ 371 (c)(1),
(2) Date: Oct. 20, 2023

(87) PCT Pub. No.: WO2022/264652
PCT Pub. Date: Dec. 22, 2022

(65) Prior Publication Data

US 2024/0190618 A1 Jun. 13, 2024

(30) Foreign Application Priority Data

Jun. 15, 2021 (JP) ................................ 2021-099112

(51) Int. Cl.

| | |
|---|---|
| ***B65D 33/18*** | (2006.01) |
| ***B31B 70/64*** | (2017.01) |
| ***B65B 5/02*** | (2006.01) |
| ***B65B 5/06*** | (2006.01) |
| ***B65B 51/14*** | (2006.01) |
| ***B65D 33/00*** | (2006.01) |
| *B31B 155/00* | (2017.01) |

(52) U.S. Cl.
CPC .............. *B65D 33/18* (2013.01); *B31B 70/64* (2017.08); *B65B 5/022* (2013.01); *B65B 5/061* (2013.01); *B65B 51/146* (2013.01); *B65D 33/007* (2013.01); *B31B 2155/00* (2017.08)

(58) Field of Classification Search
CPC .............................. B65D 33/18; B65D 33/007
USPC .................................................. 383/210–211
See application file for complete search history.

(56) References Cited

U.S. PATENT DOCUMENTS 3,217,871 A 11/1965 Lee
3,708,106 A * 1/1973 Sargent .................. B65D 33/22 383/41
3,827,625 A * 8/1974 Miller ..................... B65D 33/20 383/211
5,330,269 A * 7/1994 Kamada ............. B65D 33/2525 383/211

(Continued)

FOREIGN PATENT DOCUMENTS

JP S4967788 7/1974
JP S61107765 7/1986

(Continued)

*Primary Examiner* — Jes F Pascua
(74) *Attorney, Agent, or Firm* — JCIPRNET

(57) ABSTRACT

A bag includes a peelable portion and first and second panel parts facing each other. The bag is configured to be openable by peeling off the peelable portion. The peelable portion includes at least one joined region in which the first and second panel parts are joined to each other, and release agent application regions in which the first and second panel parts are prevented by a release agent intervening therebetween from being joined to each other, the release agent application regions being present in a pattern.

4 Claims, 12 Drawing Sheets

(56) References Cited

U.S. PATENT DOCUMENTS

| | | | | |
|---|---|---|---|---|
| 2002/0052280 | A1 | 5/2002 | Komatsu | |
| 2007/0059464 | A1 * | 3/2007 | Huffer ................ | B65D 75/5855 428/200 |
| 2021/0353905 | A1 | 11/2021 | Ketsunee et al. | |

FOREIGN PATENT DOCUMENTS

| | | |
|---|---|---|
| JP | H10119936 | 5/1998 |
| JP | 2000203600 | 7/2000 |
| JP | 2003246332 | 9/2003 |
| JP | 2005047041 | 2/2005 |
| JP | 4902149 | 3/2012 |
| JP | 2013052927 | 3/2013 |
| JP | 2014069883 | 4/2014 |
| JP | 2014162520 | 9/2014 |
| JP | 2016049978 | 4/2016 |
| JP | 2018012519 | 1/2018 |
| JP | 2019038557 | 3/2019 |
| JP | 2020063064 | 4/2020 |
| JP | 2020124422 | 8/2020 |
| JP | 2021046215 | 3/2021 |
| KR | 20130104914 | 9/2013 |

* cited by examiner

BAG

CROSS-REFERENCE TO RELATED APPLICATION

This application is a 371 application of an international PCT application serial no. PCT/JP2022/016548, filed on Mar. 31, 2022, which claims the priority benefit of Japan application JP2021-099112, filed on Jun. 15, 2021. The entirety of each of the above-mentioned patent applications is hereby incorporated by reference herein and made a part of this specification.

TECHNICAL FIELD

This application relates to a bag making apparatus and a bag making method for making peel-openable bags. This application also relates to such a bag.

BACKGROUND

A bag such as a back-lining bonded type of pouch includes two panel parts facing each other. The bag further includes a sealed portion (e. g., top sealed portion) in which the two panel parts are joined to each other by means of heat-sealing (heat-welding). A user can peel off the sealed portion to open the bag.

Such a bag may make it difficult to peel off the sealed portion thereof depending on the user's age or gender if the seal strength of the sealed portion is too strong. Users could apply too much force to the sealed portion, causing the bag to be torn and the contents therein to be scattered. Therefore, various techniques have been developed to make it easier to peel-open the bags, as disclosed in Patent documents 1 to 3, etc.

A bag making apparatus for successively making such bags from two continuous panel parts is also well-known. The bag making apparatus heat-seals the panel parts to each other using a heat seal device to form the aforementioned sealed portion.

Patent documents 4 to 6 disclose the use of a release agent, such as medium ink, to prevent heat-sealing in making bags. Patent documents 4 and 5 disclose a method for applying a release agent to a predetermined region of an inner surface of at least one of two continuous panel parts in advance before the two panel parts are heat-sealed to each other. These panel parts fail to be joined to each other in the section where the release agent intervenes between them, because the release agent prevents them from being heat-sealed to each other. As a result, these panel parts are heat-sealed to each other only in the section where the release agent does not intervene. Such a technique is utilized for defining an accommodation space in Patent document 4, and for defining an inlet or outlet of the bag in Patent documents 5 and 6.

CITATION LIST

Patent Document

Patent document 1: JP2018-12519A. Patent document 2: JP2019-38557A. Patent document 3: JP2016-49978A. Patent document 4: JP2005-47041A. Patent document 5: JP2014-162520A. Patent document 6: JP2020-63064A.

SUMMARY

This application provides making bags that are easy to peel-open, utilizing a release agent. This application also provides such bags.

According to an aspect of this application, there is provided a bag making apparatus for successively making bags from at least a first continuous panel part and a second continuous panel part, each of the bags being configured to be openable by peeling off a peelable portion, the bag making apparatus including: an application device configured to apply a release agent for prevention of heat-sealing in a pattern to a surface region of at least one of the first or second panel part corresponding to the peelable portion; a feed device configured to feed the first and second panel parts in a longitudinal direction of the first and second panel parts and to superpose the first and second panel parts on each other such that the applied release agent intervenes between the first and second panel parts; and a heat seal device configured to heat and pressurize the first and second superposed panel parts over the surface region so as to heat-seal the first and second superposed panel parts to each other in a section where the applied release agent does not intervene.

The bag making apparatus may further include: a slit device configured to slit the first and second panel parts in the longitudinal direction of the first and second panel parts; and a cross cut device disposed downstream of the heat seal device and the slit device and configured to cross-cut the first and second panel parts in a width direction of the first and second panel parts so as to shape two or more bags every cross-cutting. The slit device may include: a pair of cutters disposed to slit the first panel part in the longitudinal direction of the first panel part at two positions so as to separate a continuous strip from the first panel part; and an additional cutter disposed to slit the second panel part in the longitudinal direction of the second panel part at a position located between the two positions for the pair of cutters, the bag making apparatus being configured to make the bags each having an open edge that is formed from cut edges of the first and second panel parts resulting from slitting with the pair of cutters and the additional cutter.

The bag making apparatus may further include a cut out device configured to partially cut out the first and second panel parts such that a tab to be used for peeling off the peelable portion is formed at an edge of each bag.

According to another aspect of this application, there is provided a bag making method for successively making bags from at least a first continuous panel part and a second continuous panel part, each of the bags being configured to be openable by peeling off a peelable portion, the bag making method including: providing the first and second panel parts, wherein a release agent for prevention of heat-sealing is applied in a pattern to a surface region of at least one of the first or second panel part corresponding to the peelable portion. The method further includes: feeding the first and second panel parts in a longitudinal direction of the first and second panel parts; superposing the first and second panel parts on each other such that the applied release agent intervenes between the first and second panel parts; after superposing of the first and second panel parts, heating and pressurizing the first and second panel parts over the surface region to heat-seal the first and second panel parts to each other in a section where the applied release agent does not intervene; and after heat-sealing of the first and second panel parts, cross-cutting the first and second panel parts in a width direction of the first and second panel parts to shape the bag.

The bag making method may include applying further the release agent such that the bag has an application region in which a first panel part and a second panel part of the bag are prevented by the release agent intervening therebetween from being heat-sealed to each other, said application region being adjacent to part of an edge of the bag.

The bag making method may further include applying the release agent to the surface region in a dot pattern or a zigzag pattern.

According to yet another aspect of this application, there is provided a bag including: a peelable portion; and first and second panel parts facing each other, the bag being configured to be openable by peeling off the peelable portion, the peelable portion including: at least one joined region in which the first and second panel parts are joined to each other; and a plurality of release agent application regions in which the first and second panel parts are prevented by a release agent intervening therebetween from being joined to each other, wherein the plurality of release agent application regions are present in a pattern.

The bag may further include an open edge through which an interior of the bag and an exterior of the bag communicate with each other when the peelable portion is peeled off, wherein the open edge may be constituted by a first edge of the first panel part and a second edge of the second panel part, wherein the second edge may be located away from the first edge in an outward direction of the bag, and wherein the peelable portion may be located away from the first edge in an inward direction of the bag.

The bag may further include an open edge through which an interior of the bag and an exterior of the bag communicate with each other after the peelable portion is peeled off, and wherein the peelable portion may be located away from the open edge in an inward direction of the bag.

The bag may further include a tab formed at an edge of the bag to be used for peeling off the peelable portion, the tab including: a first tab strip formed integrally with the first panel part; and a second tab strip formed integrally with the second panel part, wherein the first and second tab strips may not be joined to each other, and wherein the first and second tab strips may partially oppose each other or may completely not oppose each other.

DETAILED DESCRIPTION

Hereinafter, bags, bag making apparatuses, and bag making methods according to implementations will be described with reference to the accompanying drawings.

Figure 1A:
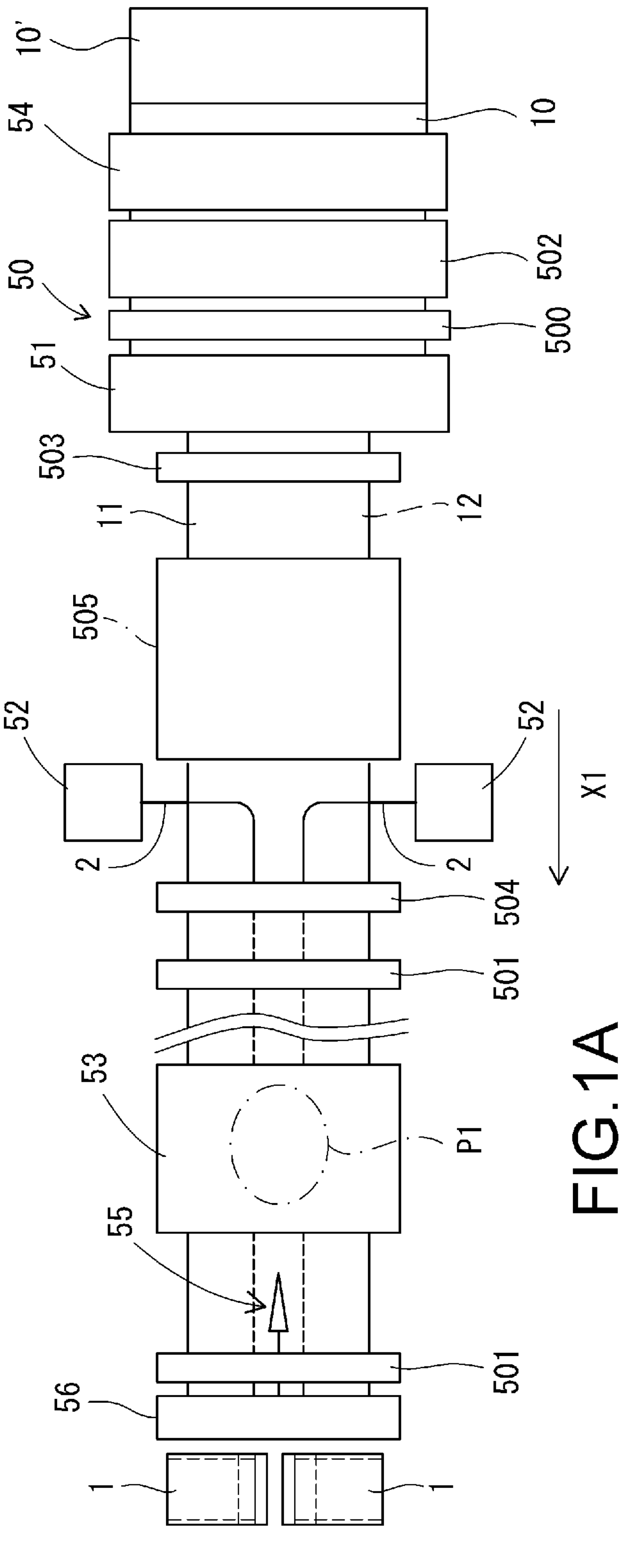
FIG. 1A is a schematic plan view of an example bag making apparatus.
Figure 1B:
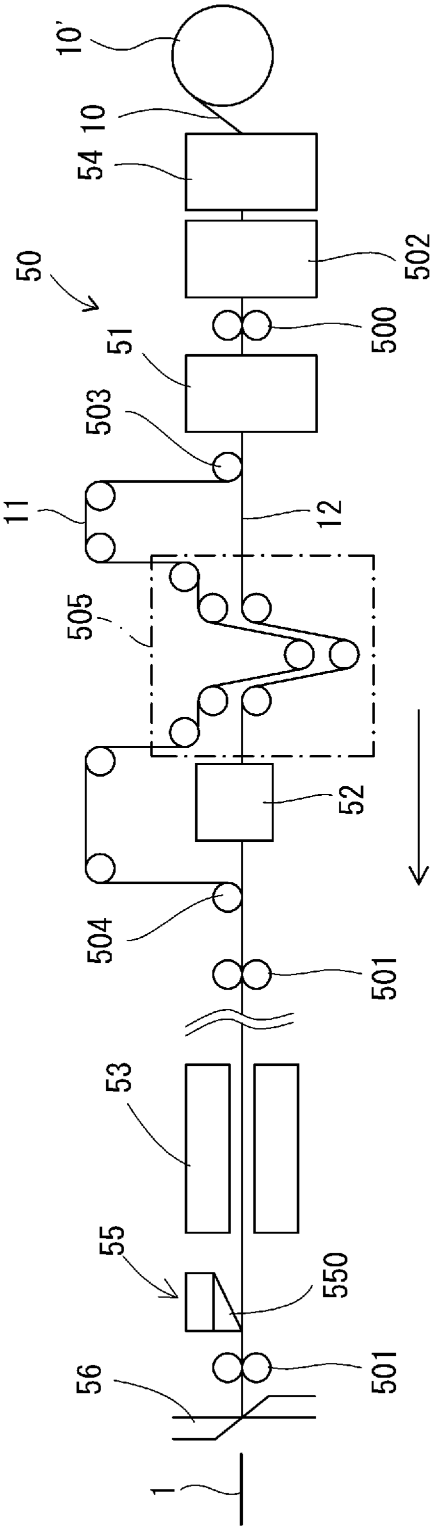
FIG. 1B is a schematic side view of FIG. 1A.

An example bag making apparatus is schematically illustrated in FIG. 1A and FIG. 1B. The bag making apparatus successively makes bags 1 from at least two continuous panel parts 11 and 12.

The panel parts 11 and 12 may be plastic films. For example, each of the panel parts 11 and 12 may be a laminated film having one surface constituted by a base layer and the other surface constituted by a sealant layer. The base layer may be, for example, OPP (oriented polypropylene), ONY (oriented nylon), or PET (oriented polyethylene terephthalate). The sealant layer may be, for example, CPP (cast polypropylene) or LDPE (low-density polyethylene). Alternatively, each of the panel parts 11 and 12 may consist of mono-material such as polyethylene. Each of the panel parts 11 and 12 may also consist of a base of paper and a film or plastic material laminated on a part or whole of the base.

The bag making apparatus includes a feed device 50 that feeds the panel parts 11 and 12 in the longitudinal direction of the panel parts. The feed direction is designated by the reference sign X1. The feed device 50 includes pairs of feed rollers 500 and 501, an accumulator unit 502, guide rollers 503 and 504, and a double-linked dancer unit 505. The feed device 50 unrolls a single wide web 10 from a roll 10' and continuously feeds it in its longitudinal direction to the accumulator unit 502 using the pair of feed rollers 500 so as to make it temporarily accumulate in the accumulator unit 502.

Furthermore, the feed device 50 feeds the web 10 from the accumulator unit 502 through a dividing device 51 that is disposed downstream of the accumulator unit. The dividing device 51 slits the web 10 in its longitudinal direction to divide it into the panel parts (panel materials) 11 and 12. Thus, the web 10 can be regarded as integrated continuous panel parts 11 and 12.

The feed device 50 vertically separates the panel parts 11 and 12 from one another at the guide roller 503, and then feeds them through the double-linked dancer unit 505. The dancer unit 505 appropriately switches the feed of the panel parts 11 and 12 from continuous feed to intermittent feed. Therefore, the feed device 50 intermittently feeds the panel parts 11 and 12 using the pair of feed rollers 501 in the zone downstream of the dancer unit 505. That is, the panel parts 10 and 11 repeat to be fed and paused.

The feed device 50 superposes the panel parts 11 and 12 on each other at the guide roller 504, and then intermittently feeds the panel parts 11 and 12 that are in the superposed state. The facing surfaces of the panel parts 11 and 12 are at least partially composed of heat-sealable (thermally weldable) material.

Instead of the dividing device 51, another example bag making apparatus may include a folding device (not illustrated) which folds the web 10 along a fold line extending in the longitudinal direction of the web. The folding device may fold the web 10 along the fold line to form the continuous panel parts 11 and 12 that are superposed on each other. In this case, the panel parts 11 and 12 are connected to each other along ones of their side edges (a fold edge) and are fed in this state.

The bag making apparatus may include an accessory component supply device 52 that supplies an accessory component(s) 2, such as a continuous zipper or a side gusset, to the panel parts 11/12 in the zone where the panel parts 11 and 12 are separated from one another, such that the accessory component 2 is interposed between the panel parts 11 and 12 when the panel parts 11 and 12 are superposed on each other. The device 52 may guide a zipper 2 as an accessory component to the space between the panel parts 11 and 12. The zipper 2 including a male member and a female member detachably fitted to one another, is guided with these members fitted to one another. In FIG. 1A, two accessory component supply devices 52 are provided to guide two zippers 2. The zippers 2 may be subsequently welded to the panel parts 11 and 12 by a welding device (not illustrated) that includes a laser unit or a seal unit.

Instead of a zipper, a side gusset(s) may be supplied as an accessory component 2. In addition, an additional device may be used to process the side gusset, such as to fold the side gusset.

The bag making apparatus further includes a heat seal device 53 that is disposed downstream of the guide roller 504 and heat-seals the panel parts 11 and 12 to each other by heating and pressurizing them. The heat seal device 53 in FIG. 1A pressurizes and heats the panel parts 11 and 12 to heat-seal them to each other in the longitudinal direction and/or the width direction of the panel parts 11 and 12 during every intermittent feed cycle of the panel parts 11 and 12. As will be described in detail later, a peelable portion 3 (see FIG. 3A, FIG. 3B, etc.) of the bag 1 is formed by the cooperation of the heat seal device 53 and the application device 54.

Figure 2:
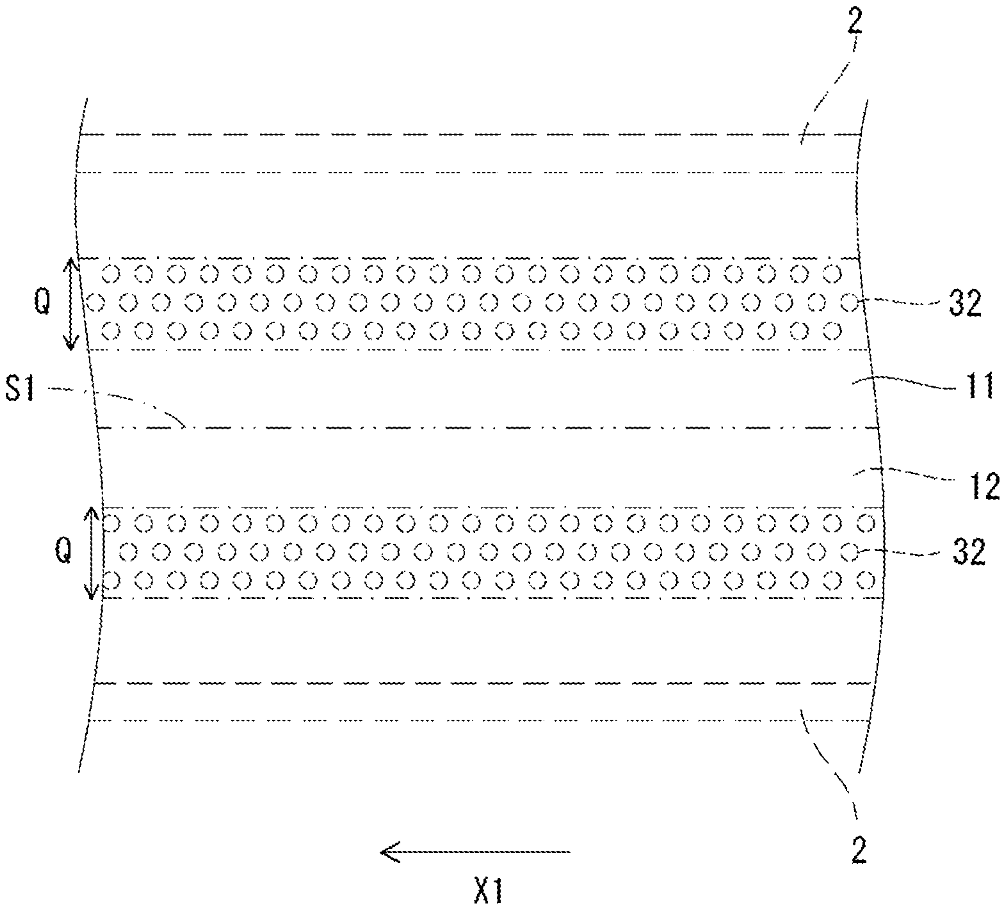
FIG. 2 is a view for describing application of a release agent and heat-sealing.

The heat seal device 53 may include a longitudinal heater that heat-seals the panel parts 11 and 12 in their longitudinal direction and/or a cross heater that heat-seals the panel parts 11 and 12 in their width direction. FIG. 2 is a schematic plan view of the panel part 11 in the area P1 of FIG. 1A. A longitudinal heater heats and pressurizes the panel parts 11 and 12 to heat-seal them using heated heat seal bars in the two heating areas Q that extend in the longitudinal direction of the panel parts 11 and 12 between the two zippers 2. Although not illustrated, a cross heater heats and pressurizes the panel parts 11 and 12 to heat-seal them using heated heat seal bars in their width direction.

The bag making apparatus may further include a slit device 55 that slits the panel parts 11 and 12 in their longitudinal direction. For example, the slit device 55 includes a cutter 550 (FIG. 1B) arranged downstream of the heat seal device 53. The panel parts 11 and 12 are slit into two lines by the cutter 550 as they are fed. The slit position is, for example, between two heating areas Q, as designated by the reference sign S1 in FIG. 2.

The bag making apparatus further includes a cross cut device 56 that cross-cuts the panel parts 11 and 12 in their width direction. The cross cut device 56 is arranged downstream of the slit device 55 and the heat seal device 53. The cross cut device 56 cross-cuts the panel parts 11 and 12 and the zippers 2 in the width direction of the panel parts 11 and 12 using a cutter during every intermittent feed cycle of the panel parts 11 and 12. Thereby, the bags 1 are shaped from the portions of the panel parts 11 and 12 and the zippers 2 that have been cut off. The cross cut position is within the section where the panel parts 11 and 12 have been heat-sealed by the cross heater. FIG. 1A illustrates a two-line bag making in which two bags 1 are shaped every cross-cutting.

Figure 3A:
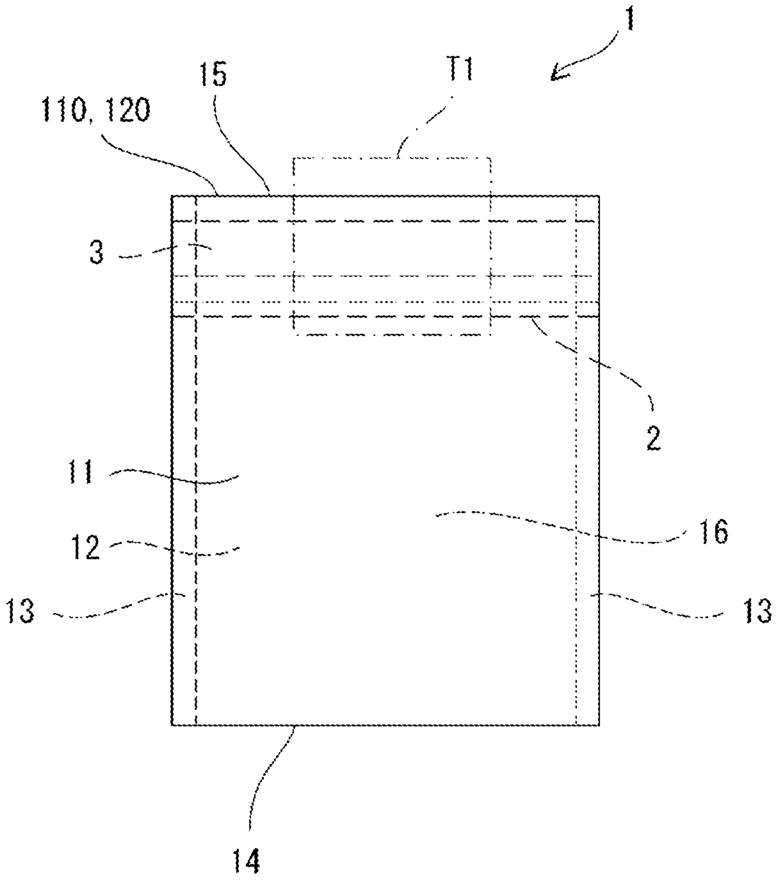
FIG. 3A is a schematic front view of an example bag.

Therefore, the bag 1 includes sheets of panel parts 11 and 12 facing each other, as illustrated in FIG. 3A. The bag 1 further includes a zipper 2 that is located between the panel parts 11 and 12 and extends across the width of the panel parts 11 and 12. In addition, the bag 1 includes side sealed portions 13 formed along the opposite side edges of the bag 1, and a peelable portion 3 located spaced away from the zipper 2 and the edge 15 between them and extending across the width of the panel parts 11 and 12.

The side sealed portions 13 are the portions in which the continuous panel parts 11 and 12 have been heat-sealed to each other by the heat seal device 53 (cross heater). In other words, in the side sealed sections 13, the panel parts 11 and 12 are joined to each other over their entire surfaces. The peelable portion 3 is formed by the application device 54 and the heat seal device 53 (longitudinal heater), as will be described in detail later. The edge 14 is formed from one side edge of each of the continuous panel parts 11 and 12. The edge 15 is formed from the cut edges resulting from the continuous panel parts 11 and 12 being slit by the slit device 55.

In FIG. 3A, the edges 14 and 15 are open edges. After cross-cutting, a filling device (not illustrated) may fill the inside 16 of the bag 1 with the contents through the open edge 14. The filling device may then heat-seal the panel parts 11 and 12 along the open edge 14 to form a bottom sealed portion, thereby closing the edge 14.

The peelable portion 3 in FIG. 3A is located slightly spaced away from the open edge 15 which is constituted by the end edges 110 and 120 of the panel parts 11 and 12. A region between the peelable portion 3 and the edge 15 is a non-joined region in which the panel parts 11 and 12 are not heat-sealed to each other. Thus, it is possible to peel the panel part 11 or 12 from the open edge 15.

Figure 3B:
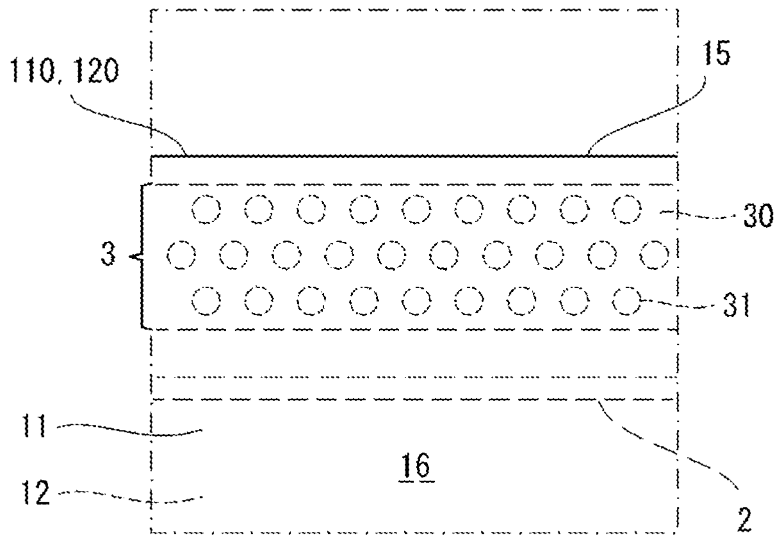
FIG. 3B is an enlarged view of an area T1 in FIG. 3A.

FIG. 3B is an enlarged view of the area T1 in FIG. 3A. The peelable portion 3 includes at least one joined region 30 and a plurality of release agent application regions 31 (hereinafter simply referred to as application regions), as illustrated in FIG. 3B.

In the joined region 30, the panel parts 11 and 12 have been heated and pressurized to be heat-sealed to each other by the heat seal device 53. Thus, the joined region 30 is a region in which the panel parts 11 and 12 are joined to each other. The joined region 30 in FIG. 3B has a substantially rectangular outer profile, and serves as a sealed portion that blocks the communication between the interior 16 and the exterior of the bag 1 through the edge 15.

In the application regions 31, a release agent 32 (FIG. 2A, FIG. 9B) for prevention of heat-sealing has been applied to the inner surface of at least one of the panel parts 11 and 12, and consequently intervenes between the panel parts 11 and 12. Due to the intervention of the release agent 32, the panel parts 11 and 12 are prevented from being heat-sealed to each other. Thus, each of the application regions 31 is a region where the panel parts 11 and 12 are not joined to each other.

The plurality of application regions 31 are present in a pattern. In FIG. 3B, the application regions 31 are present in a dot pattern. Each of the regions 31 are present to be entirely surrounded by the joined region 30, and has a circular outline (dot shape).

For the bag 1 in FIG. 3A, a user can, for example, make the interior 16 of the bag 1 and the exterior of the bag 1 communicate with each other through the open edge 15, that is, open the bag 1 by peeling the panel parts 11/12 from the open edge 15 to peel off the peelable portion 3. Furthermore, the zipper 2 allows the bag 1 to be freely re-opened.

The peelable portion 3 dotted with the multiple application regions 31 makes the joining strength (seal strength) of the entire peelable portion 3 weaker than if the entire peelable portion is a sealed portion. This means that the peelable portion 3 can be easily peeled off, and thus the bag 1 can be opened easily.

Example methods for forming such a peelable portion 3 will be described below.

Referring back to FIG. 1A and FIG. 1B, the bag making apparatus includes an application device 54 that is disposed upstream of the heat seal device 53 and applies the release agent 32 to the panel part 11 and/or 12. The application device 54 applies the release agent 32 for adjusting the joining strength of the peelable portions 3. The application device 54 in FIG. 1A may include, for example, an inkjet printer which prints the release agent 32 on the web 10 (integrated panel parts 11 and 12) by inkjet method in the zone where the panel parts 11 and/or 12 (web 10) are continuously fed.

The application device 54 may include a stamp instead of an inkjet printer and, for example, may press the stamp onto the panel part 11 and/or 12 to transfer the release agent 32 to the panel part 11 and/or 12 during every intermittent feed cycle in the zone where the panel parts 11 and 12 are intermittently fed.

The release agent 32 may be peelable ink, for example, as disclosed in the Patent documents 3 to 6, more specifically, transparent medium ink. As the release agent 32, one having a melting point higher than that of the material constituting the facing surfaces of the panel parts 11 and 12 (which are to be heat-sealed) is used.

The application device 54 applies the release agent 32 in a pattern to the surface regions of at least one of the panel parts 11 or 12 corresponding to the peelable portions 3 of the respective bags 1. For the bag 1 in FIG. 3B, the application device 54 applies the release agent 32 in a dot pattern, as illustrated in FIG. 2.

Then, when the panel parts 11 and 12 are superposed on each other at the guide roller 504 by the feed device 50, the release agent 32 applied in a pattern intervenes between the surface regions of the panel part 11 corresponding to the peelable portions 3 and the surface regions of the panel part 12 corresponding to the peelable portions 3.

Then, a heat seal device 53 (e.g., a longitudinal heater) heats and pressurizes the panel parts 11 and 12 over the above surface regions. For this, the heating areas Q (FIG. 2) are pre-adjusted in position. Furthermore, the temperature of heating is set higher than the melting point of the material constituting the facing surfaces of the panel parts 11 and 12 and lower than the melting point of the release agent 32.

As a result of such heating and pressurization by the heat seal device 53, the panel parts 11 and 12 are heat-sealed to each other in the sections in which the release agent 32 does not intervene. On the other hand, the panel parts 11 and 12 fail to be heat-sealed to each other in the sections in which the release agent 32 intervenes. In other words, the joined regions 30 are formed over the sections within the heating areas Q of the heat seal device 53, where the release agent 32 does not intervene. On the other hand, the sections where the release agent 32 intervenes result in the application regions 31 which weaken the seal strength of the peelable portion 3. In this way, the peelable portions 3 are formed.

The application areas of the release agent 32 and the heating areas Q are away from the slit position S1 (which corresponds to the edge 15), as illustrated in FIG. 2, such that the peelable portion 3 is located away from the edge 15, as illustrated in FIG. 3A.

The application of the release agent 32 in a pattern as described above is advantageous in that it is possible to adjust the joining strength of the peelable portion 3 by changing the size or density of its dots (that is, the respective application regions 31), for example, through the control of the application device 54. The dot shape (outline shape of the application region 31) can be any shape, such as a circle or a polygon like a triangle or a square (including a rhombus).

The panel part 11 and/or 12 with the release agent 32 applied in a pattern is prepared in an in-line manner by the application device 54. Alternatively, the roll 10 (panel part 11 and/or panel part 12) with the release agent 32 applied in a pattern in advance may be prepared prior to the bag making apparatus being operated. In this case, the application device 54 is omitted.

Further examples will be described below.

Figure 4:
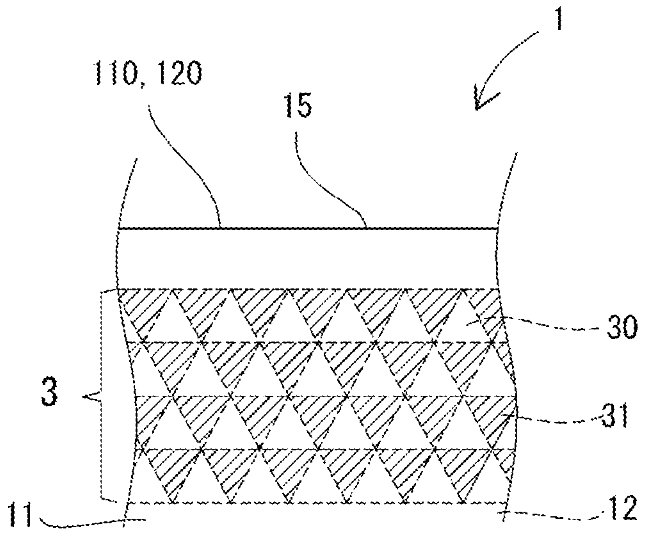
FIG. 4 partially illustrates an example peelable portion.
Figure 5A:
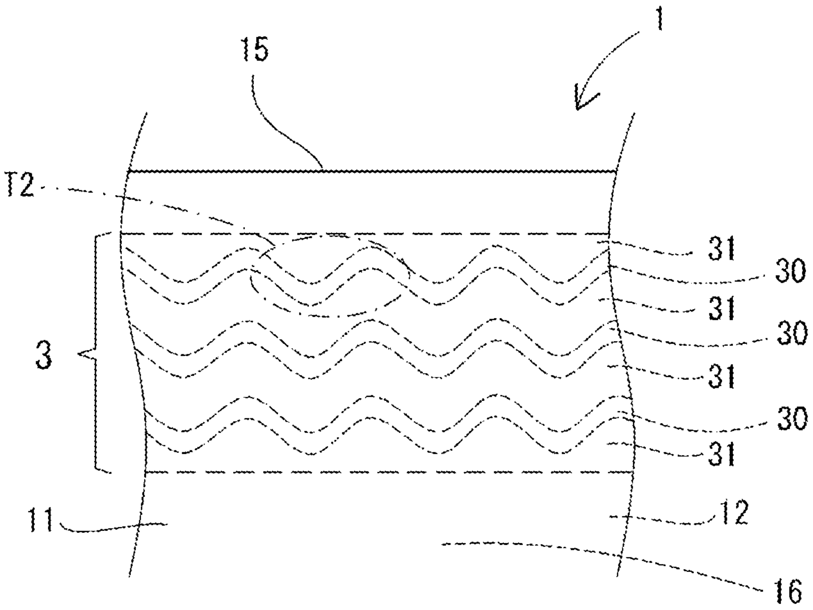
FIG. 5A partially illustrates another example peelable portion.

As illustrated in FIG. 4 and FIG. 5A, the application pattern may have an orientation.

FIG. 4 partially illustrates yet another example of a peelable portion 3. The application regions 31 are indicated with hatching to distinguish between the joined regions 30 and the application regions 31. The hatching is not the design of the bag 1 (same hereinafter).

The release agent 32 is applied in a dot pattern such that the peelable portion 3 is formed in which the triangular-shaped joined regions 30 and the triangular-shaped application regions 31 are arranged planarly, specifically, alternately and sequentially in the longitudinal and transverse directions of the bag 1. An apex of the triangle of each joined region 30 is oriented towards the open edge 15, while an apex of the triangle of each application region 31 is oriented towards the opposite to the open edge 15. This reduces the joining ratio at the outermost edge of the peelable portion 3 when it is peeled off, which makes it easier to open the bag.

The application pattern may be a zigzag pattern instead of the dot pattern. FIG. 5A partially illustrates yet another example of a peelable portion 3. As a result of the release agent 32 being applied in a zigzag pattern, the zigzag joined regions 30 and the zigzag application regions 31 extend in the width direction of the bag 1, respectively, and are arranged alternately in the outer-inner direction of the bag 1. This makes it much easier to open the peelable portion 3 from the edge 15, as the force for opening is concentrated at the tips of the zigzag shape.

Figure 5B:
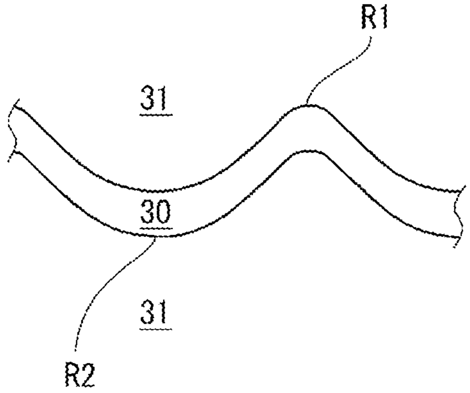
FIG. 5B illustrates a joined region and release agent application regions in an area T2 in FIG. 5A.

FIG. 5B illustrates an enlarged view of the area T2 in FIG. 5A. At the zigzag boundary between the joined region 30 and the application region 31, the tip R1 closer to the open edge 15 may have a smaller R shape (curvature) while the tip R2 further from the open edge 15 may have a larger R shape. This makes the force for opening concentrated at the tips R1 with smaller curvature in opening the bag from the edge 15, making it easier to open it. On the other hand, the joining force at the tips R2 with larger curvature resists the pressure from the inside of the bag, making the bag more difficult to rupture.

The application of the release agent 32 has the advantage that the curvatures of the tips R1 and R2 can be determined, allowing the ease of opening the bag 1 in a certain direction to be adjusted.

The peelable portion 3 described above extends across the entire width of the bag 1. Each of the bags 1 in FIG. 6A and FIG. 6B has a peelable portion 3 (consisting of the regions 30 and 31 as in the aforementioned bags) that is partially present with respect to the width of the bag 1. The peelable portion 3 is indicated with hatching.

For this, the application device 54 applies the release agent 32 in a pattern to a surface region of the panel part 11 and/or panel part 12, the surface region having the narrower width than the width of the bag 1. Of the region heat-sealed by the longitudinal heater of the heat seal device 53, the portion except for the surface region becomes the top sealed portion 17. Any application pattern (pattern of the application regions 31) may be employed.

Such a bag 1 limits the size of the opening 18 that results from the peelable portion 3 being peeled off. It is possible to provide bags that are easy to use for a variety of purposes, such as bags that prevent contents from being easily spilled.

Figure 6A:
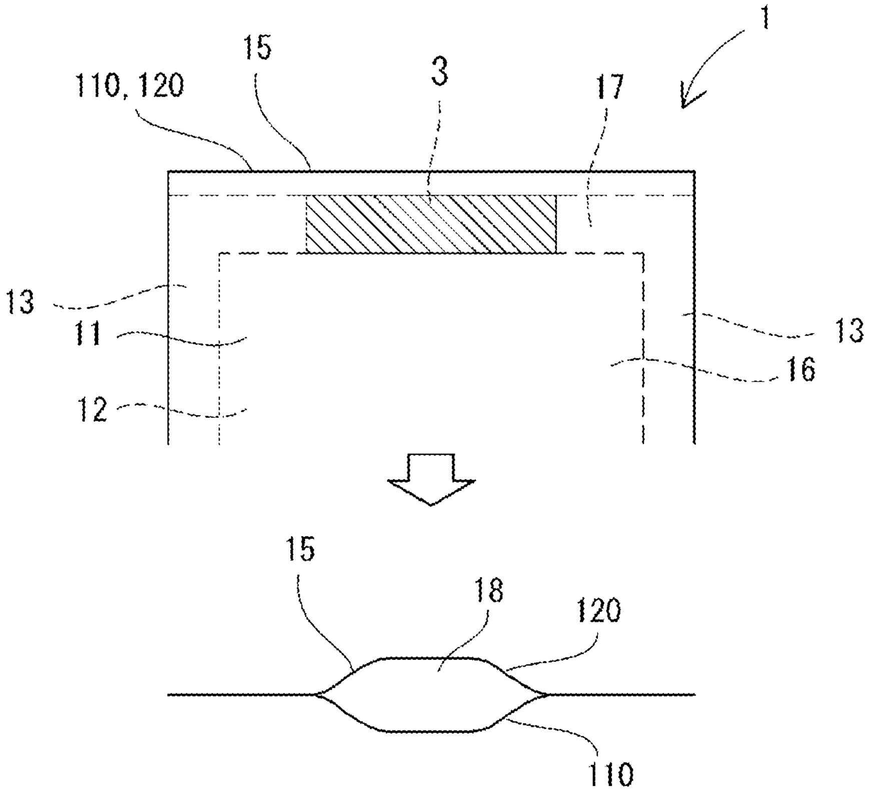
FIG. 6A and FIG. 6B each illustrate yet another example of a peelable portion.
Figure 6B:
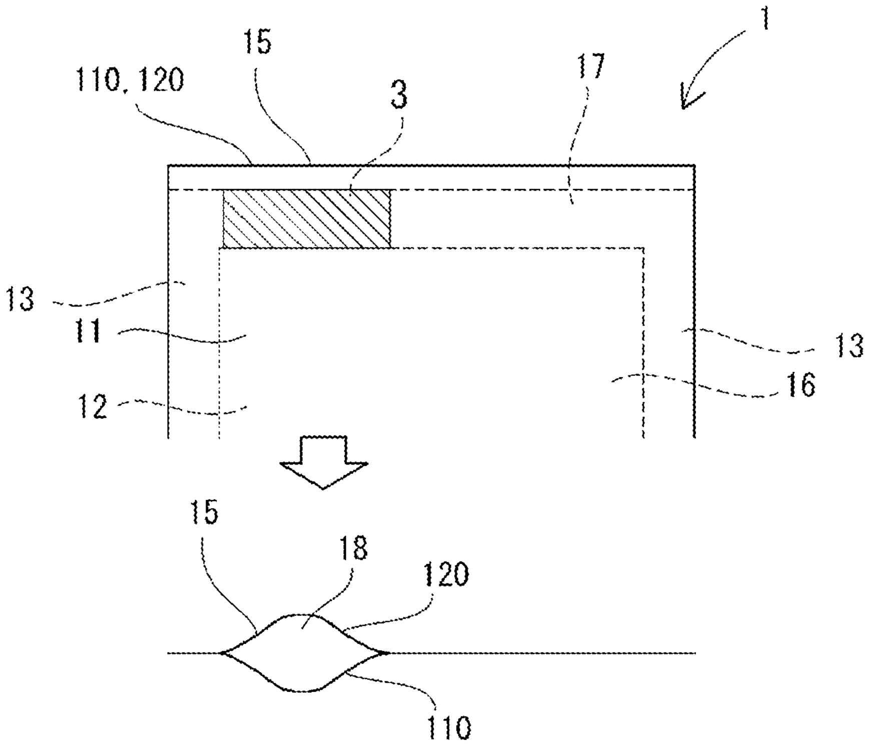

As is clear from the comparison of FIG. 6A and FIG. 6B, it is possible to adjust the position and size of the peelable portion 3 (and thus the opening 18) with respect to the bag 1 by changing the area to which the release agent 32 is applied in a pattern.

Figure 7A:
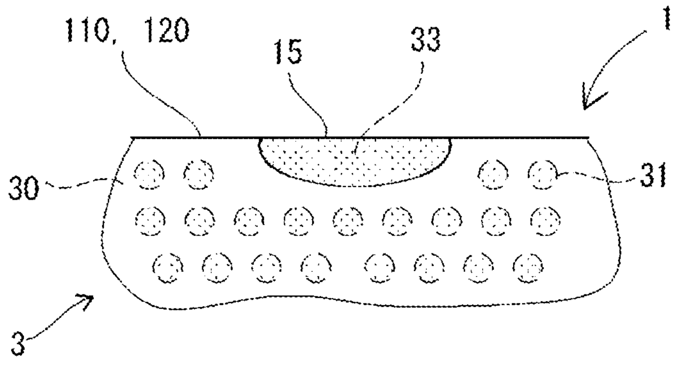
FIG. 7A and FIG. 7B illustrate yet another example of a peelable portion.

The application areas, the heating areas Q, and the slit position S1 may be set such that the peelable portion 3 is present adjacent to the edge 15, as illustrated in FIG. 7A. In addition, the release agent 32 is further applied such that an additional application region 33 is formed adjacent to part of the edge 15. This application region 33 is bounded by the edge 15 and the joined region 30. The release agent 32 intervenes between the panel parts 11 and 12 over this entire region 33, so the panel parts 11 and 12 are not joined to each other in this region 33. Only the part of the edge 15 adjacent to the application region 33 is open. A user can thus put their finger in the application region 33. This facilitates start of peel-opening the bag 1. The peelable portion 3 of this bag 1 is to be peeled off radially from the application region 33 towards inward of the bag 1.

Figure 7B:
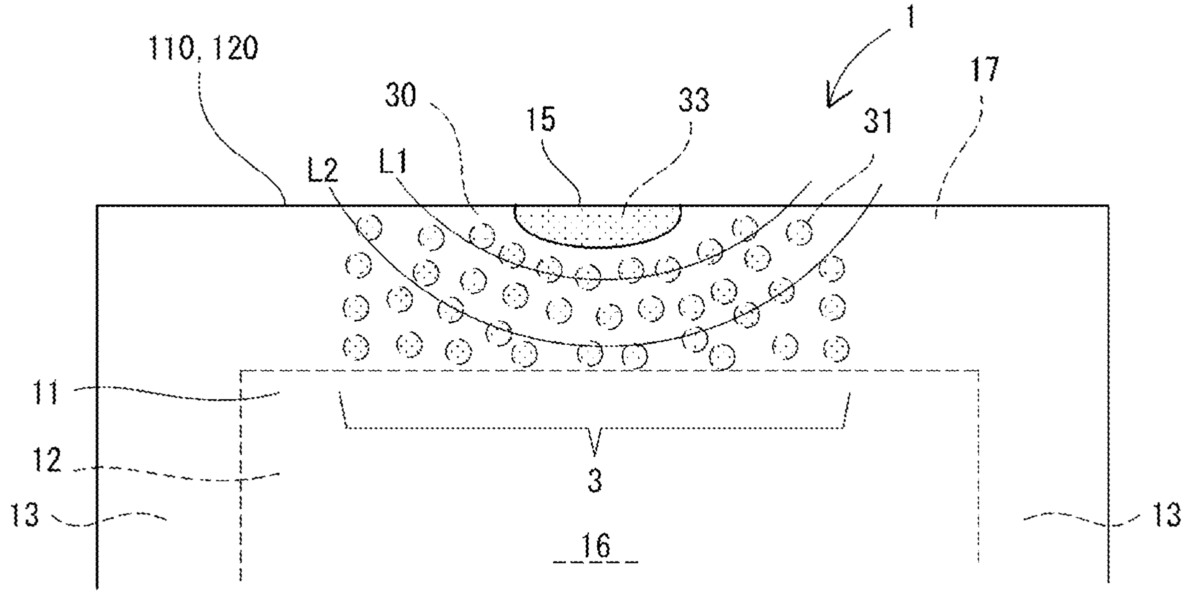

In opening the bag 1 in FIG. 7B radially from the application region 33, the joining strength is higher in line L2 than in line L1 because the application rate is lower in line L2 than in line L1. In opening the bag, the bag can be easily opened at first (line L1), and although the force required to open the bag gradually increases (line L1), the pinch space also increases, allowing the bag 1 to be opened to the inside 16 thereof.

Figure 8A:
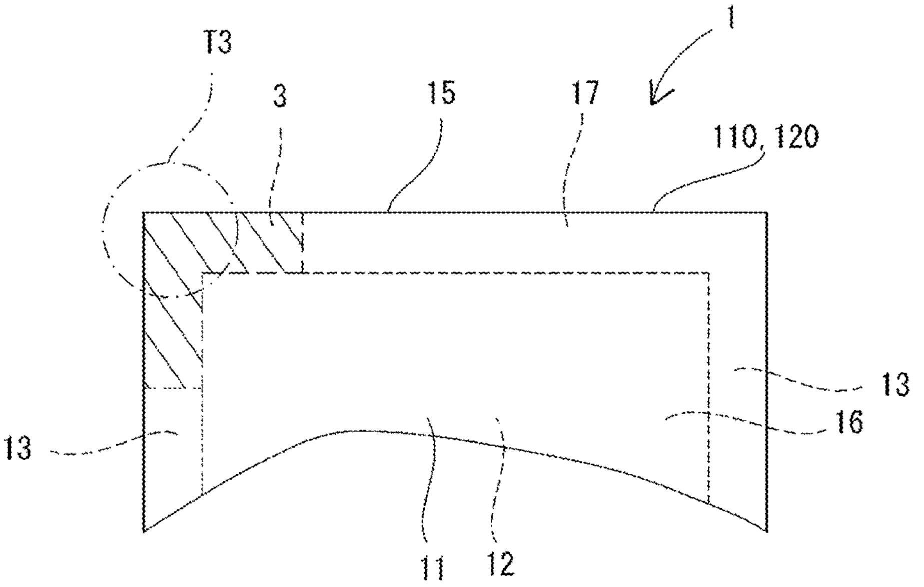
FIG. 8A illustrates yet another example peelable portion.

As illustrated in FIG. 8A, the peelable portion 3 of the bag 1 may be formed at a corner of the bag 1, i.e., adjacent to a side edge and an end edge of the bag 1. The peelable portion 3 in FIG. 8A, for example, has a substantially L-shape, instead of a rectangular shape, and is adjacent to the top sealed portion 17 and the side sealed portion 13. A user can start to peel off the peelable portion 3 of this bag 1 from the corner of the bag 1. In this case, the application device 54 applies the release agent in a pattern to a surface region of the at least one of the continuous panel part 11 or 12 corresponding to the corner of each bag 1. The application pattern may be a dot pattern, a zigzag pattern, or any other pattern.

Figure 8B:
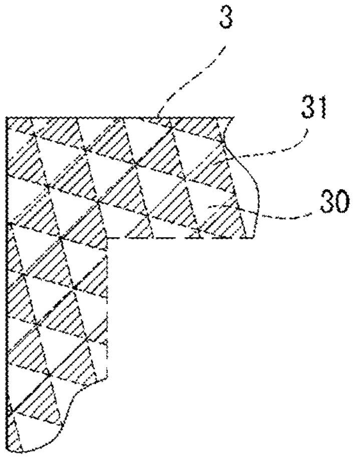
FIGS. 8B to 8D are enlarged views of an area T3 in FIG. 8A, illustrating example peelable portions.

For example, FIG. 8B is an enlarged view of the range T3 in FIG. 8A, illustrating an example peelable portion 3. As a result of the release agent 32 being applied in a dot pattern in which each dot has a triangular shape, the triangular joined regions 30 and the triangular application regions 31 are arranged planarly and alternately one after another. This facilitates peeling off the peelable portion 3 from the corner of the bag 1, which is substantially the same as the bag 1 in FIG. 4.

Figure 8C:
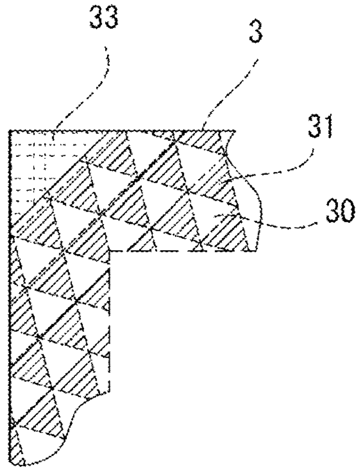

As illustrated in FIG. 8C, an additional application region 33 similar to the one in FIG. 7A may be formed at the top of the corner of the bag 1. A user can pinch and peel the panel part 11 or 12 at the application region 33 to easily start peeling off from the corner of the bag 1. For this, the release agent 32 is applied to the entire surface region of at least one of the panel parts 11 and 12 corresponding to the top of the corner of each bag 1.

Figure 8D:
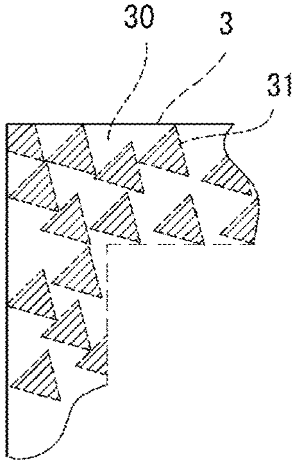

As illustrated in FIG. 8D, the dots do not have to be arranged regularly, but can be arranged in a random dot pattern. The same is applied to other example bags.

As described above, there is an advantage that the properties relating to opening the peelable portion 3, such as joining strength and ease of peeling in a specific direction, can be adjusted by change of the application pattern of the release agent, for example, through the control of the application device 54.

The bag making apparatus in FIG. 1A is configured to provide two-line bag making, but may also provide single-line bag making, or multiple-line bag making with three or more lines. The application of the release agent 32 in a pattern may be adopted for various types of bag making other than the bag making illustrated in FIG. 1A and FIG. 1B.

In some implementations, the heat seal step for forming the peelable portions 3 is carried out after the step for filling the bag 1 with the contents. For example, a filling device (not illustrated) including a heat seal device with heat seal bars may heat-seal the panel parts 11 and 12 to each other to form the peelable portions 3 after filling.

For example, in the case where the edge 14 is formed from a fold edge resulting from folding the web 10, the filling device fills the bag 1 with the contents through the open edge 15 and subsequently heat-seals (heats and pressurizes) the panel parts 11 and 12 along the open edge 15 to form the peelable portion 3 described above.

In typical bag making, a heat seal device located upstream of the filling device heat-seals the rectangular bag along its three edges. Then the filling device fills the bag with contents through one remaining edge, and subsequently heat-seals the bag along the remaining edge to seal it. In this case, this remaining edge often serves as an open edge through which the interior and exterior of the bag communicate with each other after the bag is opened. Thus, when the filling device (its heat seal device), after filling, seals the bag 1 by means of heat-sealing along the remaining edge thereof using heat seals bars, the peelable portion 3 may be formed by such heat-sealing. For this purpose, the application device 54 applies the release agent 32 to the surface region corresponding to the panel part 11 and/or the panel part 12 in advance.

Additional features will be described below.

Figure 9A:
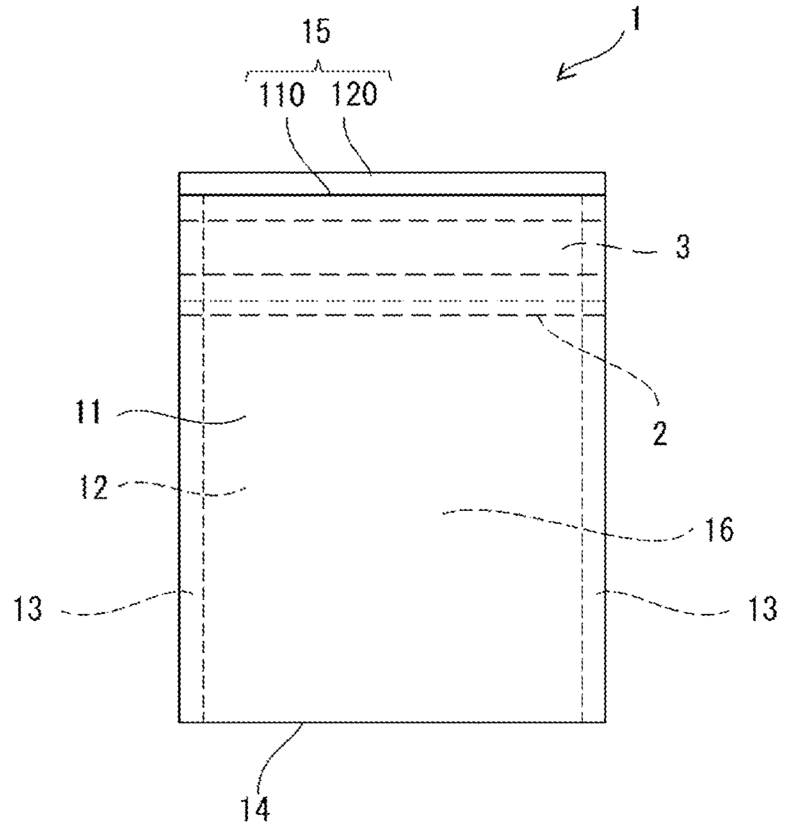
FIG. 9A illustrates yet another example bag.
Figure 9B:
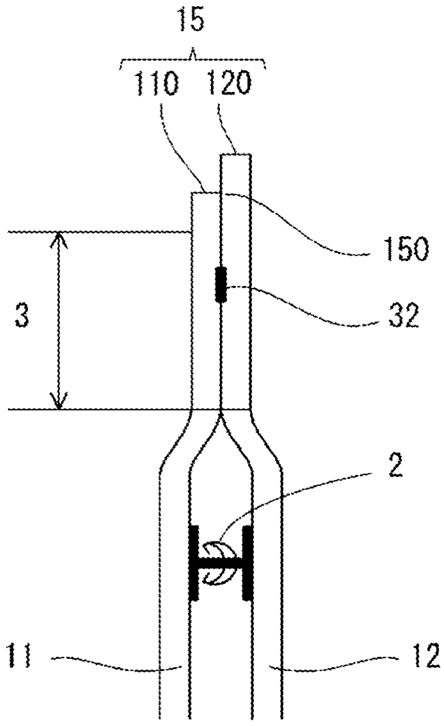
FIG. 9B is a partial longitudinal sectional view of the bag in FIG. 9A.

As illustrated in FIG. 9A, the end edge 120 of the panel part 12 may be located away from the end edge 110 of the panel part 11 in the outward direction of the bag 1, and the open edge 15 may be constituted by the end edges 110 and 120 that are displaced from one another. The peelable portion 3 may be located away from the end edge 110 in the inward direction of the bag 1. FIG. 9B is a partial longitudinal section of the bag 1 at a certain position in FIG. 9A. A step 150 is generated by the displacement of the edge edges 110 and 120, as illustrated in FIG. 9B, which makes it easier to peel the panel part 11 or 12 from the open edge 15. Therefore, a bag 1 that is easier to open is provided. Any application pattern of the release agent 32 for the peelable portion 3 may be employed.

Figure 10A:
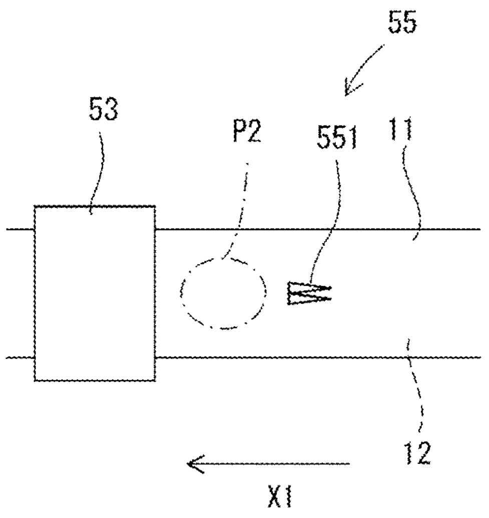
FIG. 10A to FIG. 10D are views for describing a configuration of a slit device.
Figure 10B:
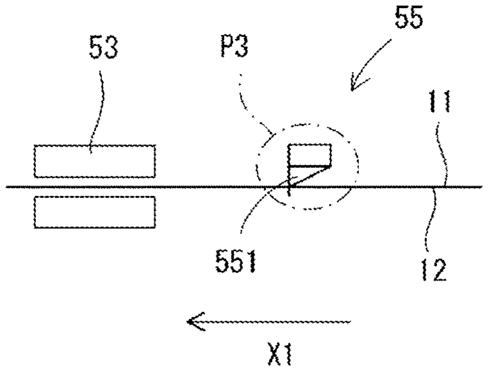
Figure 10C:
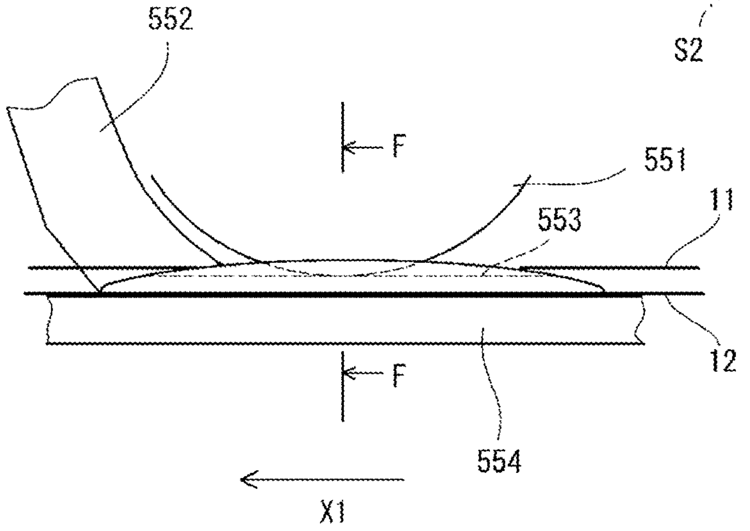

As illustrated in FIG. 10A and FIG. 10B, the slit device 55 of the bag making apparatus may include a pair of cutters 551 located upstream of the heat seal device 53 in addition to the cutter 550 of FIG. 1B in order to make the bags 1 illustrated in FIG. 9A. FIG. 10C is an enlarged view of the area P3 in FIG. 10B, and FIG. 10D is an F-F line arrow view of FIG. 10C.

Figure 10D:
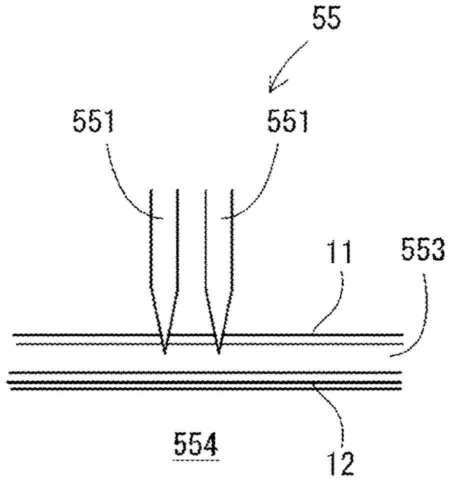

The pair of cutters 551 is supported by a frame (not illustrated) and is spaced from one another in the width direction of the panel parts 11 and 12 (see FIG. 10D). Each of the cutters 551 has a circular blade supported by the frame to be rotatable, but is not limited thereto. As illustrated in FIG. 10C, an arm 552 is supported at its base by the frame. A cutter pad 553 is supported at one side thereof by the top of the arm 552 to be located between the panel parts 11 and 12. The upper panel part 11 is sandwiched between the pair of cutters 551 and the cutter pad 553. A stage 554 is placed under the lower panel part 12 to receive the panel part 12.

Figure 10E:
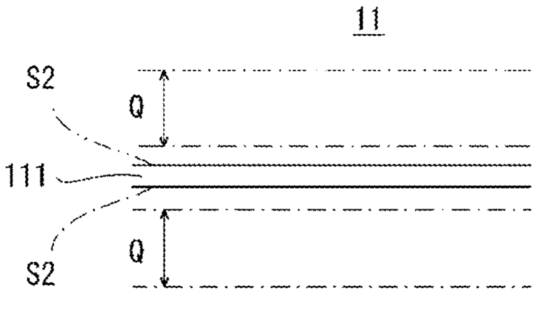
FIG. 10E is a view for describing a slitting process.

FIG. 10E is an enlarged view of the area P2 in FIG. 10A. With the above configuration, as the panel parts 11 and 12 are fed, only the panel part 11 of the two panel parts 11 and 12 is slit in its longitudinal direction at two positions by the pair of cutters 551, and a resulting continuous strip 111 is separated from the panel part 11. The slit positions, which are indicated by the reference sign S2, are set between the two heating areas Q, as in FIG. 2. The continuous strip 111 is wound and discarded by a winding unit (not illustrated). As a result, the panel part 11 is divided into two lines.

Then, as the panel parts 11 and 12 are fed, the panel part 12 is slit by an additional cutter 550 (FIG. 1B) (which is disposed downstream of the heat seal device 53) at a position between the two slit positions S2 for the pair of cutters 551 in the longitudinal direction of the panel part 12 into two lines. Thus, the slit positions S2 of the panel part 11 and the slit position of the panel part 12 are displaced from each other in their width direction.

Thereby, the end edge 110 of the bag 1 is formed from the cut edge resulting from slitting the continuous panel part 11. In addition, the end edge 120 of the bag 1, which is displaced with respect to the end edge 110, is formed from the cut edge resulting from slitting the continuous panel part 12. Therefore, the bag illustrated in FIG. 9A is made which has the open edge 15 constituted by the end edges 110 and 120 displaced from one another.

For secure slitting of the panel part 11, the cutter pad 553 may have grooves for receiving the blades of the pair of cutters 551.

Figure 11:
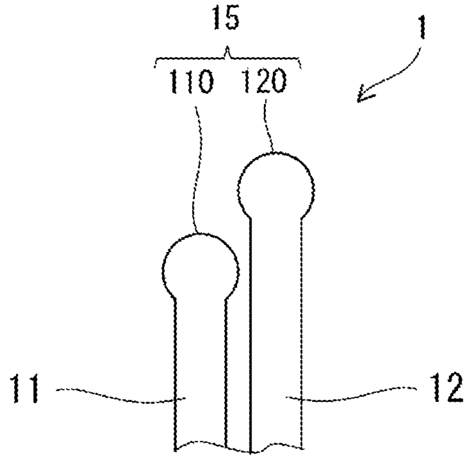
FIG. 11 is an enlarged partial cross-sectional view, illustrating example end edges of panel parts of a bag.

FIG. 11 discloses example edges 110 and 120. For the panel parts 11 and 12 made of resin such as plastic films, the end edges 110 and 120 may be heat-melted to have increased thickness and rounded shapes. This further facilitates opening the bag 1. The technique disclosed in WO2019/123876A1 may be applied for this heating.

Figure 12A:
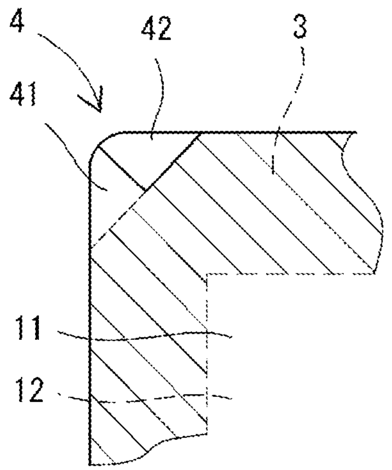
FIG. 12A to FIG. 12C illustrate example tabs of a bag, respectively.
Figure 12B:
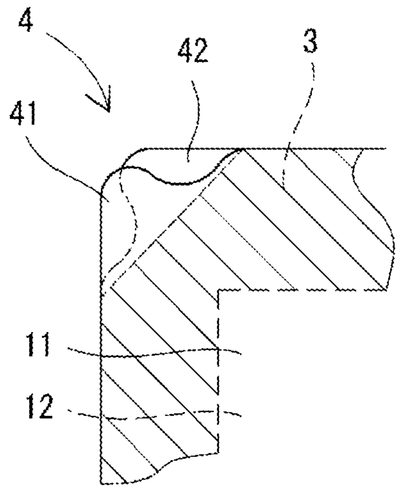
Figure 12C:
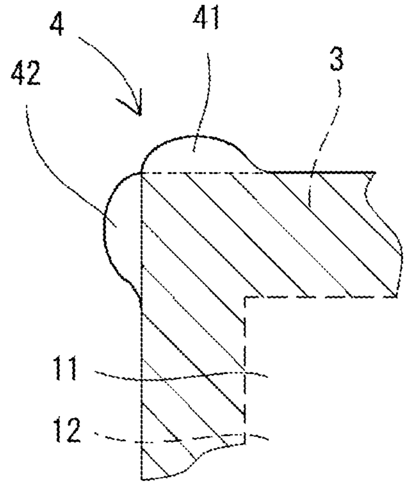

As illustrated in FIG. 12A to FIG. 12C, the bag 1 may have a tab 4 on its edge that is used to peel off the peelable portion 3. Any application pattern for the peelable portion 3 may be employed.

The tab 4 is provided adjacent to the peelable portion 3. The tab 4 includes a tab strip 41 formed integrally with the panel part 11, and a tab strip 42 integrally with the panel part 12. The tab strips 41 and 42 are not joined to each other. The tab strip 42 includes at least a portion that does not oppose to the tab strip 41. A user can pinch the tab strip 41 and/or 42 to peel the panel parts 11 and/or 12. This makes it much easier to peel off the peelable portion 3.

In FIG. 12A, each of the panel parts 11 and 12 of the bag 1 has been notched in a triangular form at the top of its corner, so that the tab strips 41 and 42 are formed, respectively. In FIG. 12A, each of the tab strips 41 and 42 has a substantial triangular shape, and they are formed to be displaced, so that they completely do not oppose each other.

In the case of making the bags 1 each with the tab 4 as illustrated in FIG. 12A, the bag making apparatus in FIG. 1A may include a cutout device (not illustrated) that partially cuts out the continuous panel parts 11 and 12. For example, the cut out device punches the continuous panel parts 11 and 12 using a Thomson blade or a punch blade to partially cut out them, respectively, in the zone upstream of the heat seal device 53 such that the tab strips 41 and 42 (that is, the tab 4) in FIG. 9A are formed on the edge of each bag 1.

The tabs 41 and 42 in FIG. 12B are also formed by the panel parts 11 and 12 being notched at the tops of their corners, respectively. The tab strips 41 and 42 partially oppose each other. For example, where the bag making apparatus makes the bags 1 of FIG. 12B, the cutout device punches the continuous panel parts 11 and 12 to partially cut out them, respectively, in the same manner as described above, such that the tabs 41 and 42 are formed on the edge of the bag 1. Furthermore, in order to prevent the tabs 41 and 42 from being heat-sealed (joined) to each other by the heat seal device 53, the release agent 32 is applied to the entire surface region of at least one of the continuous panel parts 11 or 12 corresponding to the opposing sections of the tabs 41 and 42.

The panel parts 11 and 12 in FIG. 12C have protrusions, respectively. The tabs 41 and 42 are constituted by these protrusions. The tab 41 is formed at the end of the end edge, and the tab 42 is formed at the end of the side edge, so that the tabs 41 and 42 completely do not oppose each other.

The following reference example creates a peelable portion that includes non-joined regions having a zigzag pattern (e.g., a zigzag pattern as illustrated in FIG. 5A or FIG. 5B), without the use of a release agent. The reference example uses the seal bar having the following shape. One surface of the seal bar consists of flat concave sections having a pattern similar to the zigzag pattern of the application regions 31 and flat convex sections having a pattern complementary to the zigzag pattern of the application regions 31 (that is, similar to the joined regions 30). These convex sections serve as the heat seal surface to be pressed against the panel part. Such a heat seal bar may be formed by engraving a zigzag pattern on this surface.

When heat sealing is performed using said heat seal bar, only the flat convex surface sections contact the panel part, and the concave surface sections do not contact the panel part. Thereby, a peelable portion consisting of joined regions having the shape of the convex surface sections and non-joined regions having the shape of the concave surface sections, that is, a peelable portion having a zigzag pattern, is formed substantially as in the above implementations For example, the boundaries between the concave and convex sections may have tips in which the size of the R shape (curvature) differs between the opening side of the bags and the opposite side, as in FIG. 5B. The peelable portion formed using such a heat seal bar has the same effect as the implementation in FIG. 5B, making the bag easier to open from the outside, but more difficult to rupture under pressure from the inside.

As in the implementations above, the step of forming the peelable portion according to this reference example may be performed by heat-sealing using a heat seal device upstream of a filling device, or by heat-sealing which is carried out by the filling device when it seals the bag along one edge after filling it with the contents.

The invention claimed is:

1. A bag comprising:

a peelable portion; and first and second panel parts facing each other, the bag being configured to be openable by peeling off the peelable portion, the peelable portion comprising:

at least one joined region in which the first and second panel parts are joined to each other; and a plurality of release agent application regions in which the first and second panel parts are prevented by a release agent intervening therebetween from being joined to each other, the release agent being onto the first and second panel parts before peeling off the peelable portion, wherein each of the release agent application regions has a triangular shape, and wherein first apexes of the respective release agent application regions are oriented inward of the bag and in the same direction as each other.

2. A bag making method for the bag according to claim 1, for successively making bags from at least the first panel part and the second panel part, wherein the first panel part is a continuous panel part, and the second panel part is a continuous panel part, and each of the bags being configured to be openable by peeling off the peelable portion, the bag making method comprising:

feeding the first and second panel parts in a longitudinal direction of the first and second panel parts;

applying the release agent for prevention of heat-sealing onto a surface region of at least one of the first or second panel part corresponding to the peelable portion, wherein the applying of the release agent is performed in-line using an application device;

superposing the first and second panel parts on each other to make the applied release agent intervene between the first and second panel parts;

after superposing of the first and second panel parts, heating and pressurizing the first and second panel parts over the surface region to heat-seal the first and second panel parts to each other in a section where the applied release agent does not intervene; and after heat-sealing of the first and second panel parts, cross-cutting the first and second panel parts in a width direction of the first and second panel parts to shape the bags, wherein the release agent is applied onto the surface region in a pattern manner.

3. A bag comprising:

a peelable portion; and first and second panel parts facing each other, the bag being configured to be openable by peeling off the peelable portion, the peelable portion comprising:

a plurality of joined regions in which the first and second panel parts are joined to each other; and a plurality of release agent application regions in which the first and second panel parts are prevented by a release agent intervening therebetween from being joined to each other, the release agent being onto the first and second panel parts before peeling off the peelable portion, the bag further comprising an edge through which an interior of the bag and an exterior of the bag communicate with each other after the peelable portion is peeled off, wherein the plurality of joined regions each having a triangular shape and the plurality of release agent application regions each having a triangular shape are arranged planarly, alternately and sequentially, wherein an apex of a triangle of each of the joined regions is oriented towards the edge, and wherein an apex of a triangle of each of the release agent application regions is oriented towards an opposite to the edge.

4. A bag making method for the bag according to claim 3, for successively making bags from at least the first panel part and the second panel part, wherein the first panel part is a continuous panel part, and the second panel part is a continuous panel part, and each of the bags being configured to be openable by peeling off the peelable portion, the bag making method comprising:

feeding the first and second panel parts in a longitudinal direction of the first and second panel parts;

applying the release agent for prevention of heat-sealing onto a surface region of at least one of the first or second panel part corresponding to the peelable portion, wherein the applying of the release agent is performed in-line using an application device;

superposing the first and second panel parts on each other to make the applied release agent intervene between the first and second panel parts;

after superposing of the first and second panel parts, heating and pressurizing the first and second panel parts over the surface region to heat-seal the first and second panel parts to each other in a section where the applied release agent does not intervene; and after heat-sealing of the first and second panel parts, cross-cutting the first and second panel parts in a width direction of the first and second panel parts to shape the bags, wherein the release agent is applied onto the surface region in a pattern manner.

* * * * *